United States Patent [19]

Yada et al.

[11] Patent Number: 4,701,815
[45] Date of Patent: Oct. 20, 1987

[54] TRACKING SERVO SYSTEM FOR DISC MEMORY

[75] Inventors: Hiroaki Yada; Shigeyoshi Imakoshi; Hideo Suyama; Tetsuo Sekiya, all of Kanagawa; Masayuki Nakayama, Tokyo, all of Japan

[73] Assignee: Sony Corporation, Tokyo, Japan

[21] Appl. No.: 836,714

[22] Filed: Mar. 6, 1986

[30] Foreign Application Priority Data

| Mar. 11, 1985 | [JP] | Japan | 60-47951 |
| Mar. 14, 1985 | [JP] | Japan | 60-50807 |
| Mar. 14, 1985 | [JP] | Japan | 60-50808 |
| Mar. 25, 1985 | [JP] | Japan | 60-60109 |

[51] Int. Cl.$^4$ ............................................. G11B 5/596
[52] U.S. Cl. .................................................. 360/77
[58] Field of Search ........................................ 360/77

[56] References Cited

U.S. PATENT DOCUMENTS

| 3,034,111 | 5/1962 | Hoagland et al. | 360/77 |
| 3,277,440 | 10/1966 | Gouilloud et al. | 360/77 |
| 4,165,523 | 8/1979 | Hathaway | 360/77 |

FOREIGN PATENT DOCUMENTS 6120944 5/1986 Japan.

OTHER PUBLICATIONS

IBM Technical Disclosure Bulletin, vol. 20, No. 9, Feb. 1978, pp. 3673-3674, Read/Write Servo Magnetic Head, D. McEfee.
IBM Technical Disclosure Bulletin, vol. 3, No. 11, Apr. 1961, p. 57, Positioning System, J. Hildebrand.
IBM Technical Disclosure Bulletin, vol. 15, No. 3, Aug. 1972, pp. 752-753, Discrete Magnetic Recording System, L. Shew.
IBM Technical Disclosure Bulletin, vol. 16, No. 6, Nov. 1973, pp. 1821-1823, R. Comstock et al, Triple-Layer Magnetic Recording Track Following Servo Concept with Alternating Single Frequency Servo Tracks.
IBM Technical Disclosure Bulletin, vol. 25, No. 2, Jul. 1982, pp. 778-779, Re-Recordable Servo System for Multi-Track Tape, T. Schwarz.
IBM Technical Disclosure Bulletin, vol. 15, No. 4, Sep. 1972, pp. 1320-1321, Servo Control of Multielement Magnetic Heads, V. Zimmermann et al.
IBM Technical Disclosure Bulletin, vol. 17, No. 2, Jul. 1974, pp. 456-457, Magnetic Disk Servo Control Device, V. Zimmermann et al.

Primary Examiner—George G. Stellar
Attorney, Agent, or Firm—Vorys, Sater, Seymour and Pease

[57] ABSTRACT

A servo system for positioning a data transducer head relative to a plurality of substantially concentric data tracks on the surface of a magnetic disc including a pair of servo transducer heads for sensing the data tracks and generating output signals representative of a data signal written on the sensed track, a distance between the pair of servo transducer heads being related to the dimension of the data track and a distance between the servo transducer heads and the data transducer head being related to a data track pitch, a signal processing circuit connected to the pair of servo transducer heads for generating a data transducer head positioning signal and a positioning device for positioning the data transducer head in response to the transducer positioning signal and for maintaining the track centerline alignment of the data transducer head.

18 Claims, 31 Drawing Figures

FIG. 2
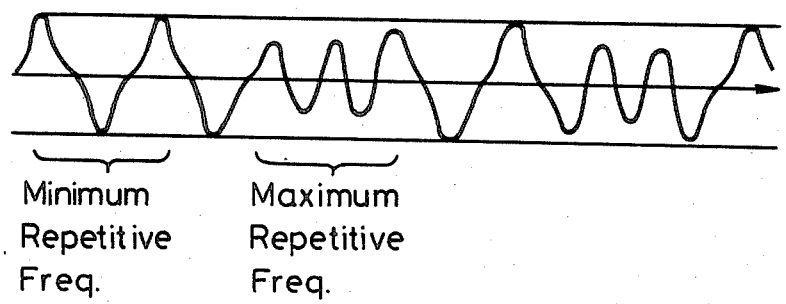
Minimum Repetitive Freq.   Maximum Repetitive Freq.
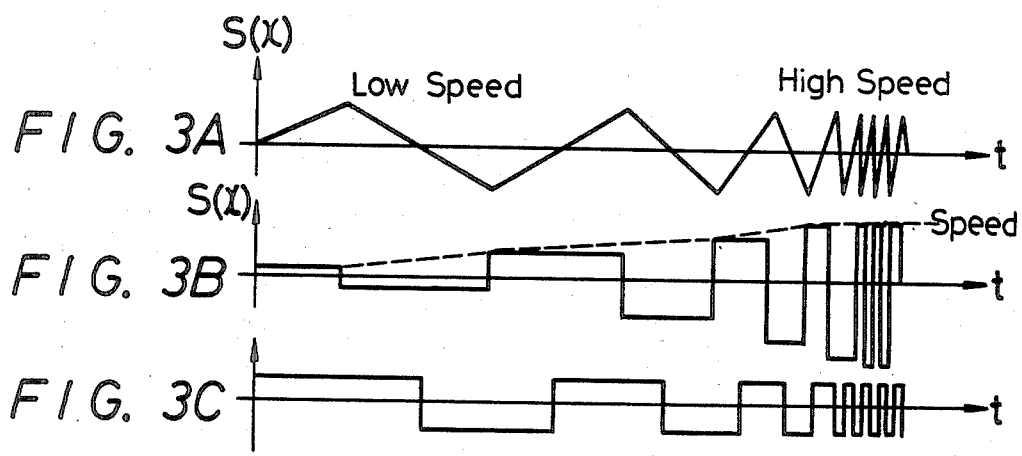
FIG. 3A
FIG. 3B
FIG. 3C

TRACKING SERVO SYSTEM FOR DISC MEMORY

BACKGROUND OF THE INVENTION

1. Field of the Invention

This invention relates generally to a tracking servo system of a magnetic disc apparatus and, more particularly, is directed to a tracking servo system for a disc memory of a magnetic disc apparatus in which servo information is obtained from a magnetic track formed on a magnetic disc and this servo information is used to accuractely position the magnetic transducer head of the apparatus.

2. Description of the Prior Art

Generally, in a tracking servo system for a magnetic disc of a magnetic disc apparatus, a control operation for positioning a transducer head is carried out mainly for the purpose of the following two points. That is, one of them is to carry out a so-called seek operation in which the transducer head is moved from one track to another track as soon as possible, while the second one is to enable the transducer head to follow the track as accurately as possible after the transducer head has moved regardless of an external disturbance, in other words, to carry out the tracking operation with high accuracy.

To carry out these control operations, it is necessary to provide detecting means for detecting servo information concerning the position and moving speed of the transducer head, etc. On the basis of the differences of the detecting means themselves, there are known the following three kinds of servo systems in the prior art.

The first servo system is an optical scale servo system which comprises a first optical scale fixed to a chassis and having slits corresponding to a plurality of tracks, a second optical scale having slits corresponding to a plurality of tracks and movable on the first optical scale in association with the transducer head and optical coupling means formed of a light emission portion and a light receiving portion located above and below the first and second optical scales, and in which when the second optical scale enters the optical path of the optical coupling means, the light amount of the light receiving portion is changed in response to the displacement amount of the second optical scale and the displacement amount is converted to and delivered as an electrical signal. The second servo system is such a servo surface servo system for a magnetic disc apparatus having a plurality of discs supported by a single shaft, in which the whole of a particular disc of the plurality of discs is employed for servo use. Then, the third servo system is an embedded type servo system in which a servo information is provided between sectors of each track recorded on the disc.

However, the respective prior art systems as mentioned above have the following defects. Specifically, in the case of the optical scale servo system, since the position of the head to be controlled and the position of the optical scale used as the detecting means are distant from each other, the optical scale servo system is weak or easily affected by the thermal expansion. The reason is that since the temperature distribution within the magnetic disc apparatus is not uniform, the temperature is different in the optical scale and the disc, and further, even when they are equal in temperature, the thermal expansion coefficient is different in the optical scale and the magnetic disc because they are made of different materials. In general, it is quite difficult to correct such difference.

The servo surface servo system requires a special disc surface for the servo operation. Particularly in the case of the magnetic disc apparatus which can not afford so many dics, the servo disc reduces the number of available data discs, thus reducing the storage capacity for data. Further, in the case of the embedded servo system, the servo information is obtained once per revolution of the disc so that troubles will occur from a head positioning precision standpoint.

OBJECTS AND SUMMARY OF THE INVENTION

Accordingly, it is a general object of the present invention to provide an improved tracking servo system for a magnetic disc apparatus.

It is an object of the present invention to provide an improved tracking servo system for a magnetic disc apparatus in which data information from a magnetic disc is converted to servo information and this servo information is used to position a magnetic transducer head, whereby to improve utilization efficiency of the surface of the magnetic disc.

It is another object of the present invention to provide a tracking servo system for a magnetic disc apparatus in which a servo transducer head and a record/reproduce transducer head are mounted on the same head slider, whereby the transducer head can be positioned stably and accurately regardless of the change of temperature.

It is a further object of the present invention to provide a tracking servo system for a disc apparatus, in which the surface of a disc from which servo information is obtained is made different from the surface of the disc on which data is written to thereby avoid the leakage of a recording signal from a record/reproduce transducer head to a servo transducer head when the data is written.

It is a yet further object of the present invention to provide a tracking servo system for a disc apparatus in which a servo information on a gap area formed between data sectors is sampled and then held, thereby always to position the transducer head with accuracy.

According to one aspect of the present invention, there is provided a tracking servo system for a disc apparatus in which data signals are detected from a magnetic track of a magnetic disc, on which a plurality of magnetic tracks each having the same track width are formed with an equal track pitch, by using a pair of servo transducer heads mounted on the same head slider on which a data record/reproduce transducer head is mounted. The data signals detected are envelope-detected by signal processing means and then a difference therebetween is derived thereby to provide servo information such as a positioning signal, a speed signal and a track passing signal of the head. Then, the servo information is used to seek a track that the record/reproduce transducer head should track and thereafter, the accurate positioning of the head is carried out.

These and other objects, features and advantages of the present invention will become apparent from the following detailed description of the preferred embodiments taken in conjunction with the accompanying drawings through which the like references designate the same elements.

BRIEF DESCRIPTION OF THE DRAWINGS

FIG. 2 and FIGS. 3A to 3C are respectively signal waveform diagrams used to explain the operation of the tracking servo system of the invention shown in FIG. 1;

DESCRIPTION OF THE PREFERRED EMBODIMENTS

Now, an embodiment of a tracking servo system for a magnetic disc apparatus according to the present invention will hereinafter be described in detail with reference to FIGS. 1 to 5.

Figure 1:
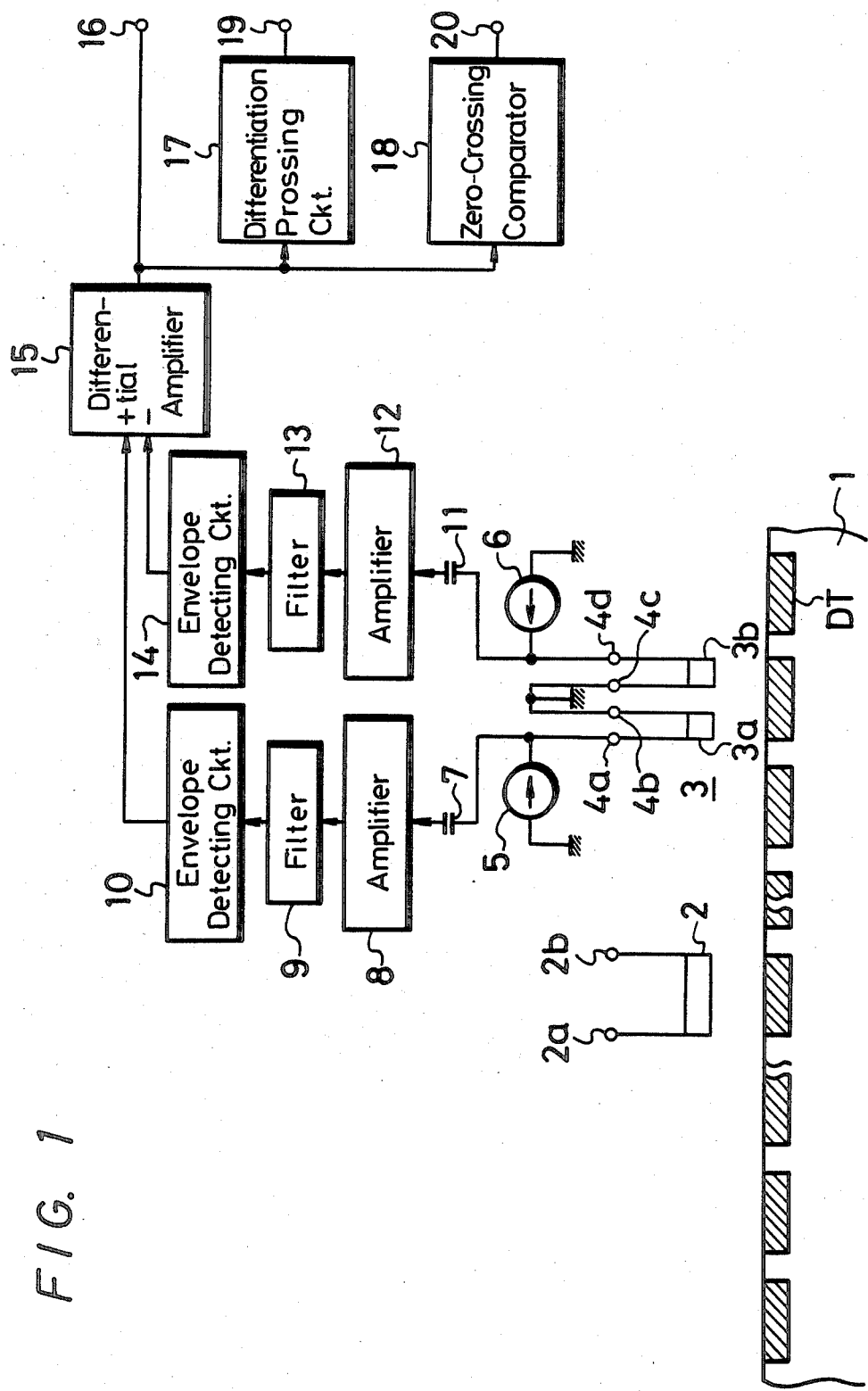
FIG. 1 is a circuit diagram showing an embodiment of a tracking servo system for a magnetic disc apparatus according to the present invention.

FIG. 1 is a schematic diagram showing a circuit arrangement of this embodiment. In FIG. 1, reference numeral 1 designates a magnetic disc or disc memory. On the disc surface of this disc 1, there are formed data tracks DT each having the same track width at an equal pitch. Reference numeral 2 designates a data record/reproduce transducer head which is provided with output terminals 2a and 2b. These output terminals 2a and 2b are respectively connected through a switching circuit to a recording amplifier and a reproducing amplifier, though not shown.

A servo head pair 3 is formed of a pair of transducer heads 3a and 3b which are mounted on the same head slider (not shown) as that of the data record/reproduce transducer head 2 in a positional relation as very close as about, for example, 100 μm. The spacing or distance between the servo head pair 3 and the data record/reproduce transducer head 2 is selected to be an integer multiple of a data track pitch or an odd multiple of the half track pitch (only the integer multiple case is illustrated in FIG. 1). The servo head pair 3 is provided with output terminals 4a to 4d and DC sense current sources 5 and 6 are respectively connected between the output terminals 4a, 4d and the ground. The output terminals 4b and 4c are connected together and then grounded. As the servo head pair 3, there is employed a magnetic transducer head utilizing the magnetoresistance effect (a so-called "Mr head"). The servo head pair 3 is one, for example, that is substantially made of a permalloy metal thin film attached with taps at an equal spacing and from which lead wires are led out. Since in principle the servo head pair 3, namely, the MR head senses the change of a magnetic field and then changes its resistance value, when it is operated, the DC sense current source is required. For this reason, the two current sources 5 and 6 are prepared as described above.

The output terminal 4a is connected through a capacitor 7, an amplifier 8, a filter 9 and an envelope detecting circuit 10 to a non-inverting input terminal of a differential amplifier 15, while the output terminal 4d is connected through a capacitor 11, an amplifier 12, a filter 13 and an envelope detecting circuit 14 to an inverting input terminal of the differential amplifier 15. From the output side of the differential amplifier 15, there is led out an output terminal 16 at which a head positioning (head displacement) signal is developed. The output of the differential amplifier 15 is connected to a differentiation processing circuit 17 and a zero-crossing comparator 18. From the differentiation processing circuit 17, there is led out an output terminal 19 at which a speed signal is developed, while from the zero-crossing comparator 18, there is led out an output terminal 20 at which a passing signal is developed.

The servo head pair 3 is adapted to read out data signals from the data track DT. The data signals read out therefrom are amplified by the amplifiers 8 and 12 and then fed to the envelope detecting circuits 10 and 14 in which the envelopes thereof are detected, respectively. Since the servo head pair 3 reads out the data, the output signals therefrom are fluctuated at random in response to the contents of the data. However, upon recording, the data is modulated on the basis of a predetermined modulation system so that the output signals thereof lie below a certain regular rule statistically. Accordingly, the maximum values of the envelopes obtained at the output sides of the envelope detecting circuits 10 and 14 take substantially constant values on a certain track if the data is random data. In other words, the envelopes thereof become those having a minimum repetitive frequency that is normally determined by the modulation system. FIG. 2 is a signal waveform diagram of a waveform when the envelope of the data signal is detected. From FIG. 2, it will be apparent that the maximum value of the envelope can be obtained at the lowest repetitive frequency.

The envelopes thus obtained and derived from the envelope detecting circuits 10 and 14 are supplied to the differential amplifier 15 which then generates a difference therebetween. This difference becomes a head positioning (head displacement) signal S(x) shown in FIG. 3A. This head positioning signal has a triangular waveform whose inclination becomes gentle when the servo head pair 3 crosses the data track DT at a low speed, while this head positioning signal has a waveform whose inclination becomes sharp when the servo head pair 3 crosses the data track DT at a high speed. In other words, the inclination of the triangular wave of the head positioning signal is proportional to the moving speed of the servo head pair 3.

Accordingly, if such head positioning signal is supplied to the differentiation processing circuit 17 in which a time differentiation d/dt S(x) is carried out and the envelope thereof is obtained, the amplitude thereof becomes proportional to the moving speed of the servo head pair 3. FIG. 3B illustrates the waveform of the output derived from the differentiation processing circuit 17 at that time.

If the positioning signal is supplied to the zero-crossing comparator 18 in which it is converted to a square wave signal as shown in FIG. 3C, the leading or trailing edge thereof indicates a track passing point of the servo head pair 3. As will be described later, there exist two kinds of zero-cross points in the head positioning signal. Accordingly, it is sufficient to use one of the leading and trailing edges of the square wave.

The head positioning signal developed at the output terminal 16 is supplied to a servo control circuit (not shown) and then it is used for the tracking operation to enable the data record/reproduce head 2 accurately to follow the track after the head was moved. On the other hand, the speed signal and the track passing signal developed at the output terminals 19 and 20 are supplied to the servo control circuit (not shown) in the same way as the head positioning signal and are used for the seek operation to move the head from a certain track to a target track.

Figure 4:
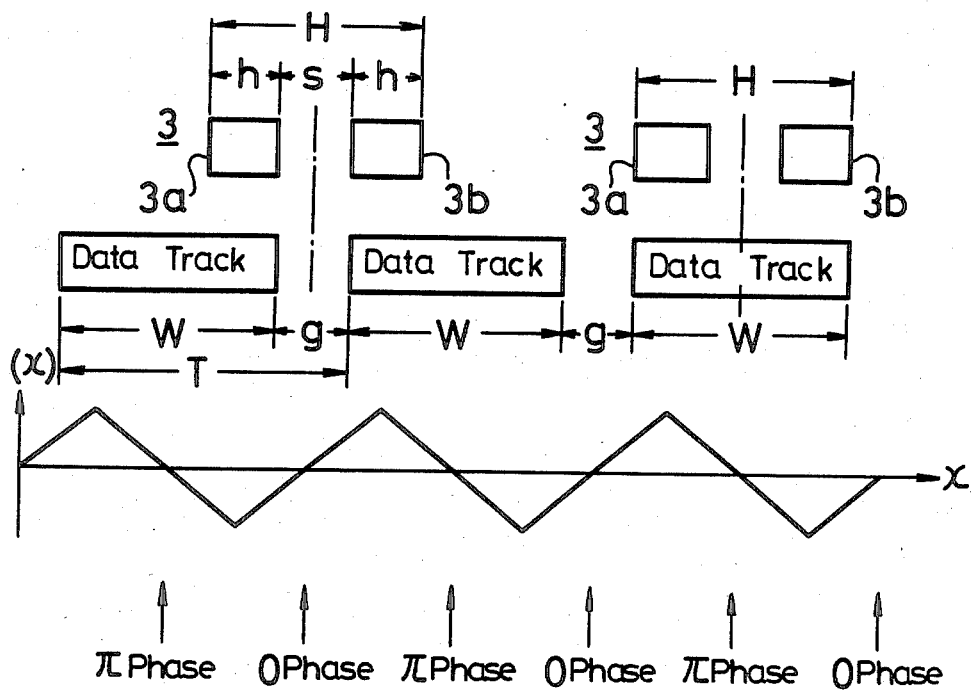
FIG. 4 is a schematic diagram showing a relationship among dimension and position of a servo transducer head pair relative to a head position signal.

Subsequently, a relationship between the dimension of the servo head pair 3 and the output waveform S(x) of the head positioning signal will be described with reference to FIG. 4. In FIG. 4, W assumes a data track width, T assumes a track pitch width, g assumes a guard band width, h assumes a head width constructing the servo head pair 3, s assumes a head distance between the heads 3a and 3b, and H assumes a width of the servo head pair 3. Then, FIG. 4 illustrates exactly the dimensional relation and the waveform to establish the equation that is given as $$g = h = s, \quad W = H = 3g \quad (1)$$

Referring to FIG. 4, if the servo head pair 3 is moved in the x-axis direction, the difference between the envelopes from both the heads 3a and 3b, i.e., the head positioning signal S(x) generated at the output side of the differential amplifier 15 becomes a triangular waveform shown in FIG. 4. A point at which S(x)=0 is established is a balanced point of the servo. There are two kinds of the balanced points which are respectively referred to as a 0 phase and a $\pi$ phase. At the 0 phase, the heads 3a and 3b of the servo head pair 3 are tracked to different adjacent data tracks respectively, while at the $\pi$ phase, the heads 3a and 3b are both tracked to the same data track. Whether the 0 phase or the $\pi$ phase is selected as the balanced point of the servo is determined by a positional relation of the distance between the servo head pair 3 and the data record/reproduce head 2 relative to the track pitch. For instance, if the spacing or distance between the two heads 3a and 3b is selected to be an integer multiple of the track pitch, the $\pi$ phase will be selected as the balanced point of the servo operation.

When the dimension of the servo head pair 3 satisfies the conditions of the above mentioned Eq. (1), the head positioning signal S(x) becomes a perfect triangular waveform. However, when the aforesaid conditional Eq. (1) is not established, the head positioning signal S(x) does not become the perfect triangular waveform. Therefore, an explantion will be given on what relational equation should be satisfied by each dimension of the servo head pair 3 so that the position signal S(x) may have a satisfactory waveform.

Figure 5A:
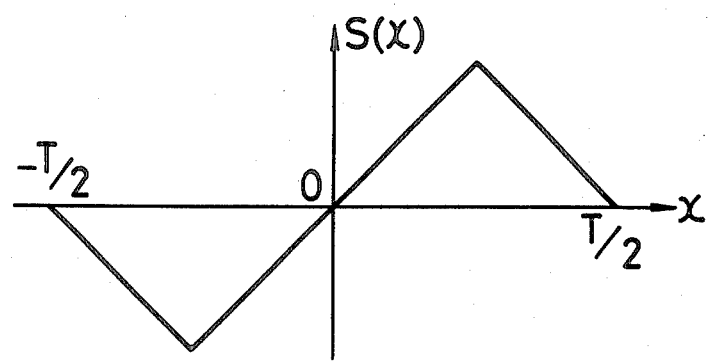
FIGS. 5A the 5D are respectively signal waveform diagrams used to explain various conditions under which conversion characteristics and other characteristics can be prevented from being deteriorated.
Figure 5B:
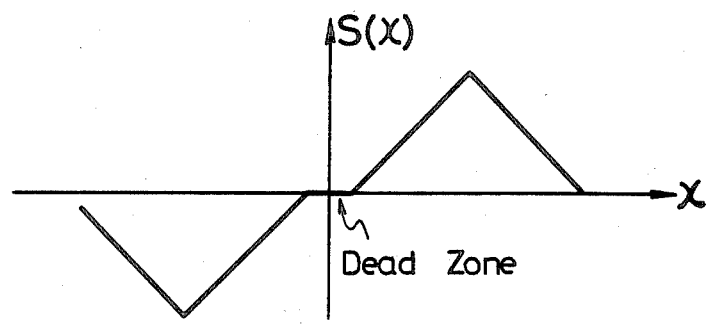
Figure 5C:
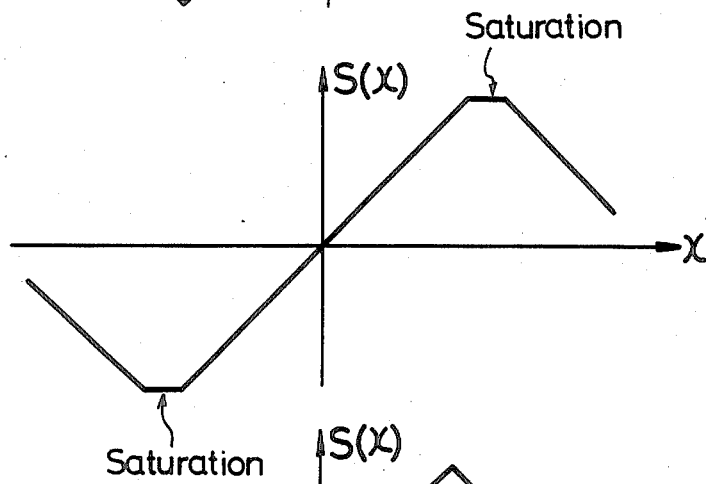

When one period of the triangular waveform of the positioning signal S(x) is extracted, it becomes as shown in FIG. 5A. If the dimensions relating to the servo head pair 3 are inappropriate, a dead zone or saturation as shown in FIG. 5B or FIG. 5C occurs so that the conversion characteristic as the servo information detecting means is deteriorated. The dead zone shown in FIG. 5B causes the accuracy in determining the position by the tracking servo to be deteriorated. This dead zone takes part in each of the 0 phase and the $\pi$ phase. It will be appreciated that this dead zone should be removed. While the saturation shown in FIG. 5C causes the dynamic range of the tracking servo to be made narrow, it is permissible that a small amount of the saturation will exist.

Further, there arises a problem of a so-called cross talk that is not relating to the conversion characteristic but it has a possibility that it will disturb the operation of the servo information detecting means. When the head width h is large as compared with the guard band width g, the cross talk of magnetic flux occurs through the servo head pair 3 between the adjacent data tracks. Thus, it is most desirable to prevent such cross talk from arising.

To avoid the deterioration of these characteristics, the dimensional relation between the servo head pair 3 and the data track have to satisfy the following equations.

$$\text{cross talk inhibiting condition: } h \leq g \quad (2)$$

$$\text{saturation inhibiting condition: } h \geq g \quad (3)$$

$$\text{0 phase dead zone inhibiting condition: } s \leq g \quad (4)$$

$$\pi \text{ phase dead zone inhibiting condition: } H \geq W \quad (5)$$

Figure 5D:
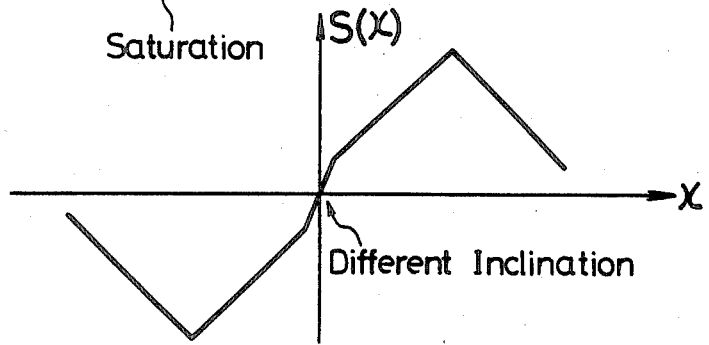

Of these equations (2) to (5), it is impossible to simultaneously satisfy both the conditions of the Eqs. (2) and (3) when the servo transducer head is manufactured in practice. For this reason, the Eq. (2), which is the more important condition, should be satisfied. Although it is possible to prevent the dead zone from arising at each of the phases by satisfying the Eqs. (4) and (5) simultaneously, it is sufficient that the servo information detecting means can prevent the dead zone from occurring in either of the 0 phase and the $\pi$ phase. At that time, if the condition of either the Eq. (4) or (5) is satisfied so that the dead zone can be avoided, the zero-crossing portion of the triangular wave is given a different inclination as shown in FIG. 5D, in which the conversion gain is increased. This disadvantage can be removed by designing the proper servo circuit system.

According to the above embodiment of the present invention as set forth above, since the data track itself is utilized to obtained to servo information, the disc surface and the track served for the servo operation become unnecessary so that the utilization efficiency of the disc surface can be increased. Further, since the servo head pair and the data record/reproduce head are mounted on the same head slider and the servo head pair and the data record/reproduce head are located in a positional relation as very close as, for example, about 100 $\mu$m, the positional displacement caused therebetween by the thermal expansion becomes very small. As a result, it becomes possible to construct the servo mechanism for positioning the magnetic transducer head which can be prevented from being affected very much by the thermal expansion. Further, since all the servo information can be obtained from the head slider which includes the servo head pair, it is not necessary to provide additional servo sensor assembly parts. Hence the tracking servo system of the invention can be simplified in its mechanism. Furthermore, it is possible to obtain three kinds of necessary servo information from one pair of heads, such as position, speed and tracking passing number by skillfully arranging the dimension and the layout of the servo head pair. This will reduce the number of terminals that are led out from the head slider.

In addition, since the tracking servo system for a disc of the invention is not formed as a time division system unlike the embedded type servo system, it is possible to obtain the servo information continuously.

Figure 6:
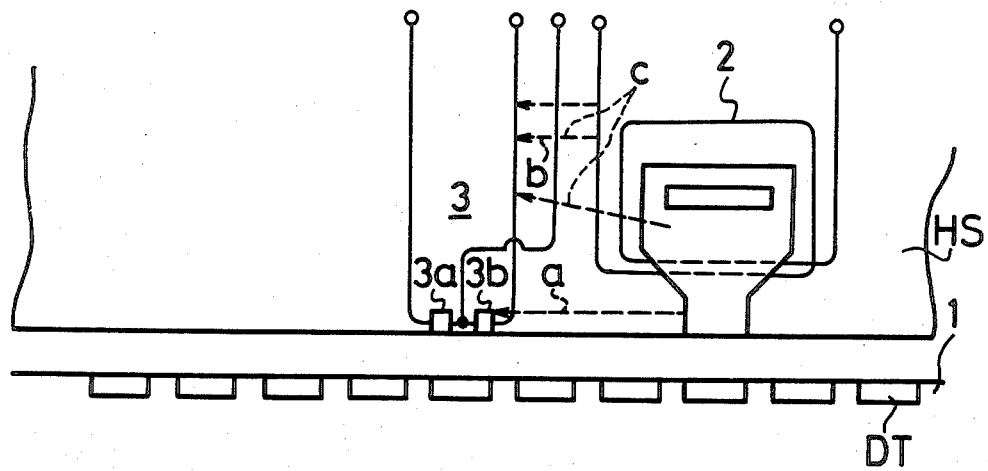
FIG. 6 is a schematic diagram showing more fully the arrangement of the transducer heads used in the present invention.

By the way, in the tracking servo system using a head structure as shown in FIG. 6, when data is written in a certain track by using a data record/reproduce head 2, if the servo is effected by using a servo head pair 3 mounted on a head slider HS on which the data record/reproduce head 2 is mounted, a leakage of a recording signal from the data record/reproduce head 2 to the servo head pair 3 arises and this leakage causes a recording current, which is supplied to the data record/reproduce head 2, to effect the output signal from the servo head pair 3. As a result, there is a fear that a servo for positioning the data record/reproduce head 2 will not be made correctly.

There can be considered various causes which cause the interference or the leakage of the recording signal from the data record/reproduced head 2 to the servo head pair 3 to arise. In this case, three kinds of coupling causes may be enumerated: a magnetic coupling as shown by an arrow a; an electrostatic coupling as shown by an arrow b; and an electromagnetic induction coupling as shown by an arrow c in FIG. 6. Fundamentally, these couplings arise because the servo head pair 3 and the data record/reproduce head 2 are located closely.

Figure 7:
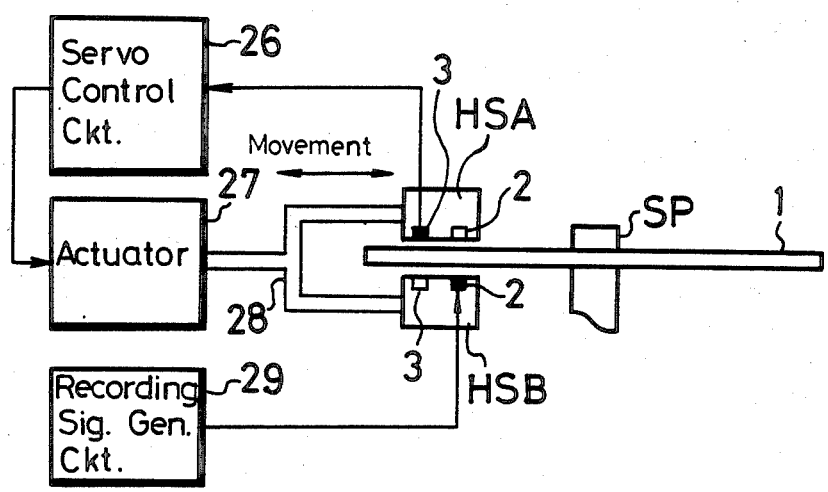
FIGS. 7 and 8 are respectively schematic diagrams showing other embodiments of the tracking servo system for a disc apparatus according to this invention.

Taking these defects into consideration, more improved embodiments of the tracking servo system for a disc apparatus according to the present invention will be described. FIG. 7 is a schematic diagram showing another embodiment of the invention, in which a single disc is available.

Referrring to FIG. 7, a disc 1 is attached to a spindle SP. Head sliders HSA and HSB are located in opposing relation to the front surface and the back surface of this disc 1 so as to become movable along the radial directions thereof. On each of the head sliders HSA and HSB, there are mounted a servo head 3 and a data record/reproduce head 2, respectively. A servo control circuit 26 is supplied with a servo information from the servo head 3, and this servo control circuit 26 controls an actuator 27. The actuator 27 is adapted to drive the head sliders HSA and HSB via an arm 28 to thereby position the same. The head sliders HSA and HSB are coupled to each other by the arm 28. The recording signal generating circuit 29 is adapted to generate and supply a recording signal (recording current) to the data record/reproduce head 2.

Since the single disc 1 is used in this embodiment, when the recording current is supplied from the recording signal generating circuit 29 to the data record/reproduce head 2 located on the head slider HSB so as to write the data on the back surface of the disc 1, the servo information is detected by the servo head 3 that is mounted on the head slider HSA that is located on the front surface of the disc 1 and fed to the servo control circuit 26. Then, the servo control circuit 26 controls the actuator 27 to drive the head sliders HSA and HSB to thereby effect the servo control for positioning the head 2.

At that time, since the disc 1, which is usually made of an aluminum base plate, is interposed between the data record/reproduce head 2 which carries the writing of data and the servo head 3 which provides the servo information, the resultant shield effect prevents the leakage of the recording signal from the data record/reproduce head 2 on the head slider HSA to the servo head 3 on the head slider HSB.

When the data is written in the front surface of the disc 1 and also the servo information is obtained from the back surface thereof, the recording signal generating circuit 29 and the servo control circuit 26 are switchably connected to the head sliders corresponding to the surfaces relating thereto, though not shown.

Even when the temperature on the tracking servo system of this embodiment is changed, it should be noted that exactly the same positional displacement will be caused by the thermal expansion to both the head sliders HSA and HSB, resulting in a small deterioration of the accuracy in positioning the transducer head regardless of the fact that the data record/reproduce head 2 and the servo head 3 are not mounted on the same head slider.

Figure 8:
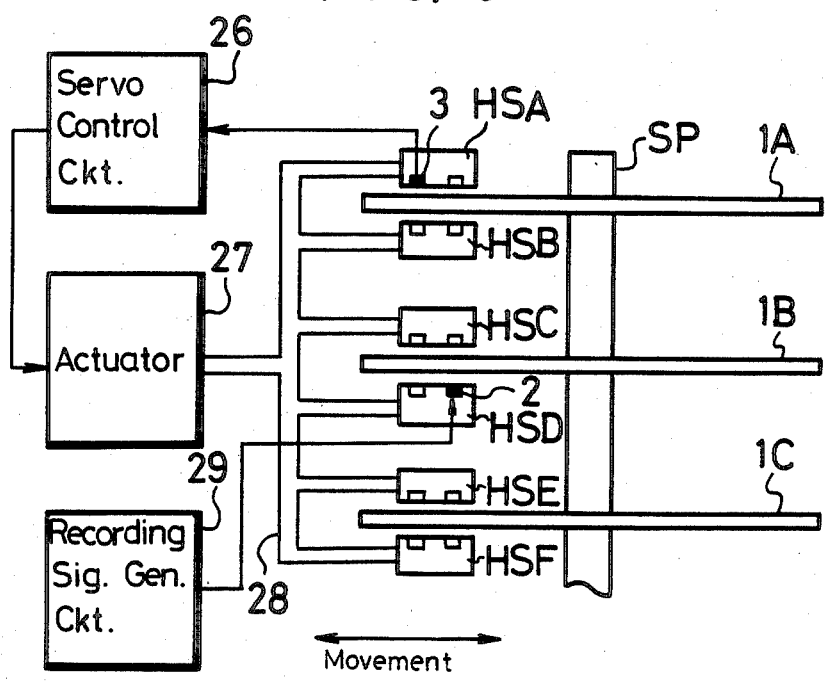

FIG. 8 shows a case in which a plurality of discs 1A, 1B and 1C are available. In FIG. 8, like parts corresponding to those in FIG. 7 are marked with the same references and will not be described in detail.

Referring to FIG. 8, a plurality of disc memories 1A, 1B and 1C are attached to the spindle SP. A plurality of head slinders HSA to HSF each having the servo head 3 and the data record/reproduce head 2 are located in opposing relation to the front surface and the back surface of these discs 1A, 1B and 1C. These head sliders HSA to HSF are all coupled by the arm 28 and are driven by the actuator 27.

For example, when the recording current from the recording signal generating circuit 29 is supplied to the data record/reproduce head 2 on the head slider HSD to thereby write the data on the back surface of the disc 1B, the servo information is detected by the servo head 3 of the head slider HSA that is located on the front surface of the disc 1A and then fed to the servo control circuit 26. Then, the servo control circuit 26 controls the actuator 27 and this actuator 27 drives the head sliders HSA to HSF via the arm 28, thus positioning the magnetic transducer head.

At that time, since the discs 1A and 1B are interposed between the record/reproduce head 2 which carries out the writing and the servo head 3 which provides the servo information, the resultant shield effect can prevent the interference or leakage of the recording signal from the data record/reproduce head 2 on the head slider HSD to the servo head 3 on the head slider HSA.

While the combination of the head sliders HSA to HSF is not limited to the above mentioned combination, it is possible to combine any two of the head sliders HSA to HSF. For example, it is possible that the data is written by the data record/reproduce head 2 of the head slider HSE; while the servo control is made by the servo head 3 of the head slider HSA. Of course, at that time, the recording signal from the recording signal generating circuit 29 is supplied to the data record/reproduce head 2 mounted on the head slider HSE.

A further embodiment of the tracking servo system for the disc apparatus according to the present invention will be described next in detail with reference to FIGS. 9 to 12. In accordance with this embodiment, it is intended to prevent the leakage of the recording signal from the data record/reproduce transducer head to the servo transducer head.

Figure 9:
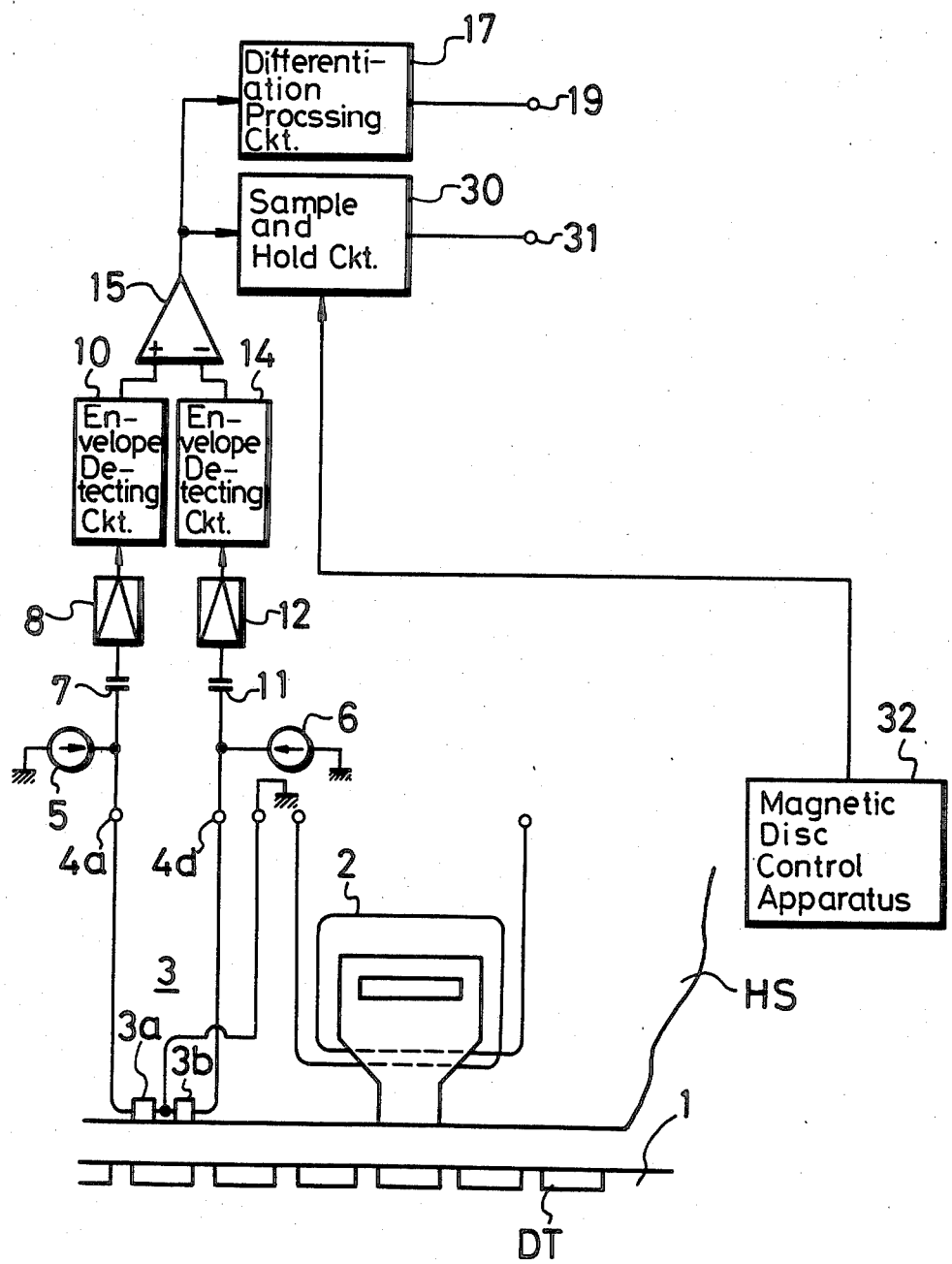
FIG. 9 is a circuit diagram showing a further embodiment of the tracking servo system for a magnetic disc apparatus according to the present invention.

FIG. 9 is a circuit diagram showing this embodiment.

Figure 10:
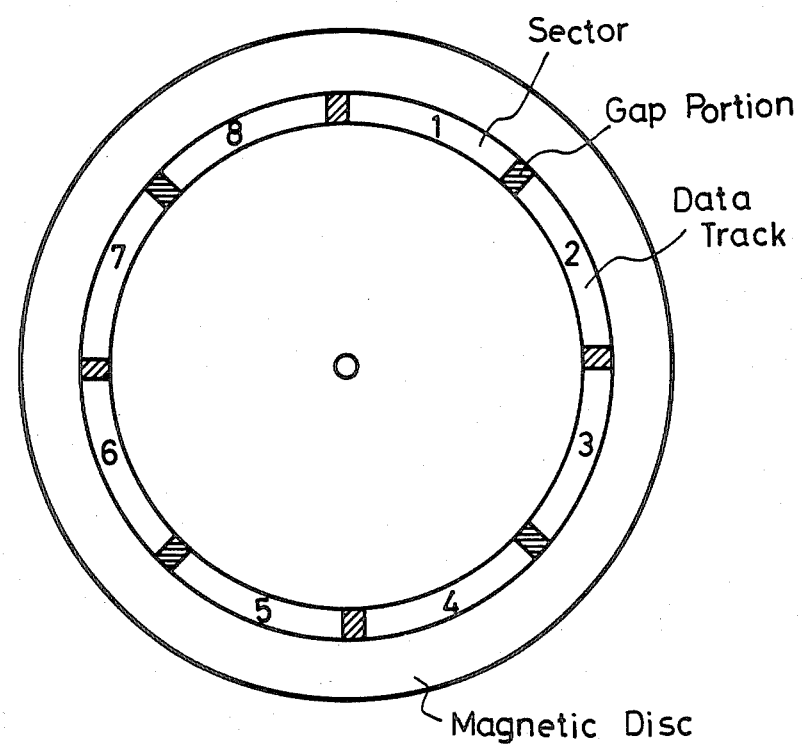
FIG. 10 is a schematic diagram used to explain the distribution of sectors in one track on a magnetic disc.

Referring to FIG. 9, a magnetic disc 1 is provided, on which data tracks DT each having the same track width are written at an equal pitch. One circumference of each of the data tracks DT written on the disc 1 is divided into a pluraltiy of sectors, for example, eight sectors as shown in FIG. 10. At the rear end portion of each sector, i.e., area between adjacent sectors, there is provided an area called an "inter-record gap area". This inter-record gap portion or area is adapted to prevent the adjacent sector from being destroyed by the deviation of a write timing and the like arising when a certain sector is rewritten. On this inter-record gap area, there is already recorded a certain fixed pattern upon deliverly from factories and this recorded fixed pattern can not be rewritten by the user.

Figure 11:
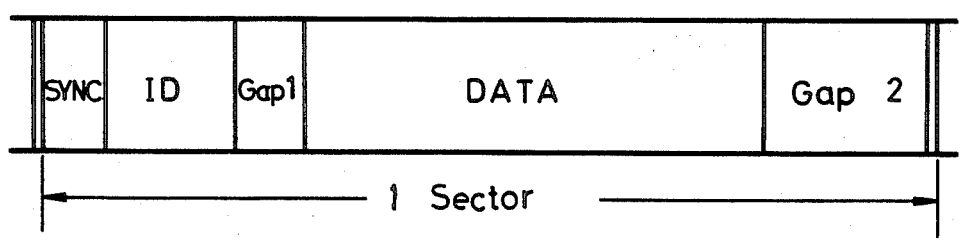
FIG. 11 is a schematic diagram useful for explaining the the construction of one sector on the disc shown in FIG. 10.

One sector is formed as shown in FIG. 11 and which sequentially comprises, from the left-hand side of FIG. 11, a sync. code area (SYNC), an identification code area (ID), a write space gap area (Gap 1), a data area (DATA) and an inter-record gap area (Gap 2). The sync. code area (SYNC) is used for synchronization, the identification code area (ID) is used for identifying, for example, the sector number, the write space gap area (Gap 1) is used to prepare a time necessary for switching the read mode to the write mode, and the inter-record gap area (Gap 2) is used as described before in connection with FIG. 10. The write space gap area (Gap 1) is normally given, for example, 2 to 3 bytes and the inter-record gap area (Gap 2) is given a data length about five times the write space gap area (Gap 1).

Since the signal processing from the servo head pair 3 to the differential amplifier 15 in FIG. 9 is carried out in like manner shown in FIG. 1, it will not be described here for simplicity.

In FIG. 9, the head positioning signal developed at the output side of the differential amplifier 15 is directly supplied to the servo control circuit (not shown) in the same way as the speed signal and the like and in which it is used for the tracking operation to enable the head to correctly trace the track after the head was moved. If the head positioning signal is directly supplied to the servo control circuit, there is produced such an interval in which the servo head 3 is operated while the data record/reproduce head 2 is in the write mode. This causes the accuracy of positioning the head to be deteriorated by the interference, or the leakage of the recording signal from the record/reproduced head 2 to the servo head 3.

Therefore, in this embodiment shown in FIG. 9, a head positioning signal before the data is written is extracted and supplied to the servo control circuit as a true servo information (positioning signal). To this end, a sample and hold circuit 30 is provided at the output side of the differential amplifier 15, and a magnetic disc control apparatus 32 is provided as control means for substantially supplying a sampling pulse to the sample and hold circuit 30.

As the magnetic disc control apparatus 32, such one which is normally provided in the magnetic disc apparatus is available. If the signal from the magnetic disc control apparatus 32 is used, it is possible to positively detect the read/write timing. According, the control signal from this magnetic disc control apparatus 32 is used as the sampling pulse.

The head positioning signal supplied to the sample and hold circuit 30 from the differential amplifier 15 is sampled and then held by the sampling pulse (control signal) from the magnetic disc control apparatus 32. As a result, the servo information (head positioning signal) before the data is written is developed at an output terminal 31 led out from the sample and hold circuit 30.

Figure 12A:
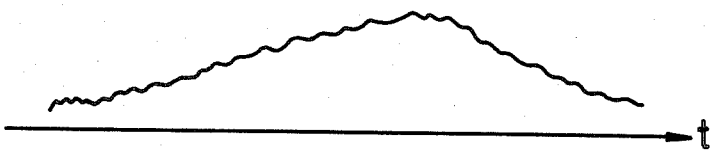
FIGS. 12A to 12G are timing charts useful for explaining the operation of the embodiment shown in FIG. 9, respectively.
Figure 12B:
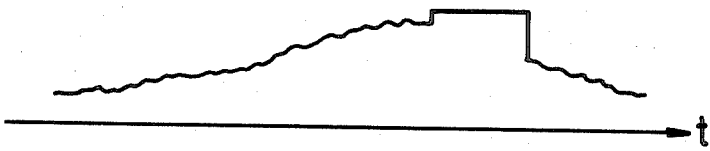
Figure 12C:
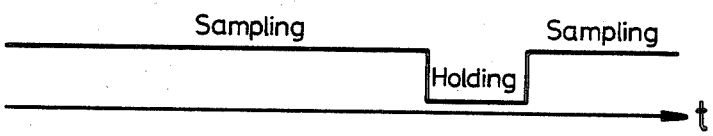
Figure 12D:
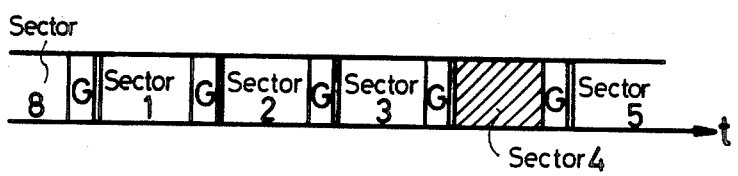
Figure 12E:
Figure 12F:
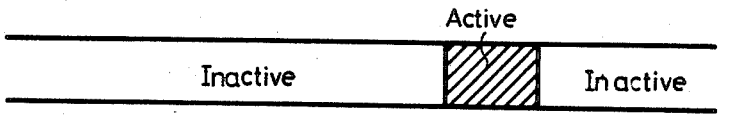
Figure 12G:
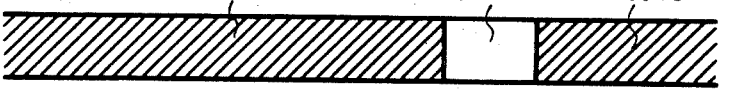

FIGS. 12A to 12G illustrate timing relations with which a certain sector in the data track DT is rewritten, respectively. In this case, let us assume that the data on the sector 4 is to be rewritten by the over-writing. FIG. 12A shows the head positioning signal that is generated at the output side of the differential amplifier 15; FIG. 12B shows the head positioning signal that was sampled and held by the sample and hold circuit 30; FIG. 12C shows the sampling and holding state of the sample and hold circuit 30; FIG. 12D shows the distribution of sectors on a certain data track DT; FIG. 12E shows the recording and reproducing states of the magnetic disc control apparatus 32; FIG. 12F shows the operation state of the data record/reproduce head 2; and FIG. 12G shows the operation state of the servo head 3, respectively.

When the control signal is generated from the magnetic disc control apparatus 32, the sample and hold circuit 30 repeatedly carries out the sampling and holding operations in response to the control signal as shown in FIG. 12C. On the basis of the control signal as the sampling pulse supplied before the data is written, the sample and hold circuit 30 samples and holds the head positioning signal from the differential amplifier 15 as shown in FIG. 12A. Consequently, the sample and hold circuit 30 generates at its output side the head positioning signal substantially as shown in FIG. 12B which corresponds only to the gap area of the sector before the data is written.

The hatched area in FIG. 12G illustrates a time period in which the servo head 3 is placed in the active state, while the unhatched area indicates a time period in which the servo head 3 is placed in the inactive state, which substantially coincides with the timing of the sampling pulse shown in FIG. 12C. The servo head 3 effects the servo by using the servo information (positioning signal) corresponding to the gap portion obtained in the sampling time period, while during the holding time period, the data is written by the data record/reproduce head 2. In other words, during the period in which the data is written substantially, the servo head 3 is set in the inactive state, while during the period in which the servo head 3 is set in the active state, the data is not written. Accordingly, since neither of the servo head 3 and the data record/reproduce head 2 are placed in the active state simultaneously from a time standpoint, when the data is written, it is possible to prevent the leakage of the recording signal from the data record/reproduce head 2 to the servo head 3.

When the time period corresponding to the sector 4 in FIG. 12D arrives, the data record/reproduce head 2 is put into the active state whereby the sector 4 is over-written. Further, the sample and hold operation is not necessarily carried out immediately before the data is written. For example, when the head slider is moved by the actuator and stabilized with a little duration of time after the servo information is sampled and held, it is possible that the servo information is sampled and held with the corresponding duration of time before the data is written.

As set forth above, the tracking servo system for a disc apparatus for effecting the servo by using the envelope from the data track has, in addition to the aforesaid problem of the leakage or interference arising when the data is written, the following problem.

Generally, in this kind of tracking servo system for a disc apparatus, the servo is effected for positioning the transducer head while the data is being over-written (when the data track is rewritten, the old data is not erased but instead, a new data is written). In such case, if a large external disturbance arises from some cause, such large external disturbance can not be suppressed by the servo so that the data is written at a wrong position displaced from the inherent track position with the result that the track width is made wide apparently. However, since the afore-mentioned method assumes that the dimension of the track on the disc is accurate, if the track width is changed, the operation of the overall servo mechanism for positioning the transducer head becomes useless. There is then a problem that the accuracy in positioning the transducer head will be deteriorated. This problem becomes particularly significant in a disc in which the track pitch is made quite small to afford the large storage capacity. Hence, this problem can not be neglected.

With reference to FIG. 13 to FIGS. 14A to 14G, a further modified embodiment of the tracking servo system for a disc apparatus according to the present invention will be described in detail hereinafter, in which the above mentioned problem arising from the over-writing of data can be solved.

Figure 13:
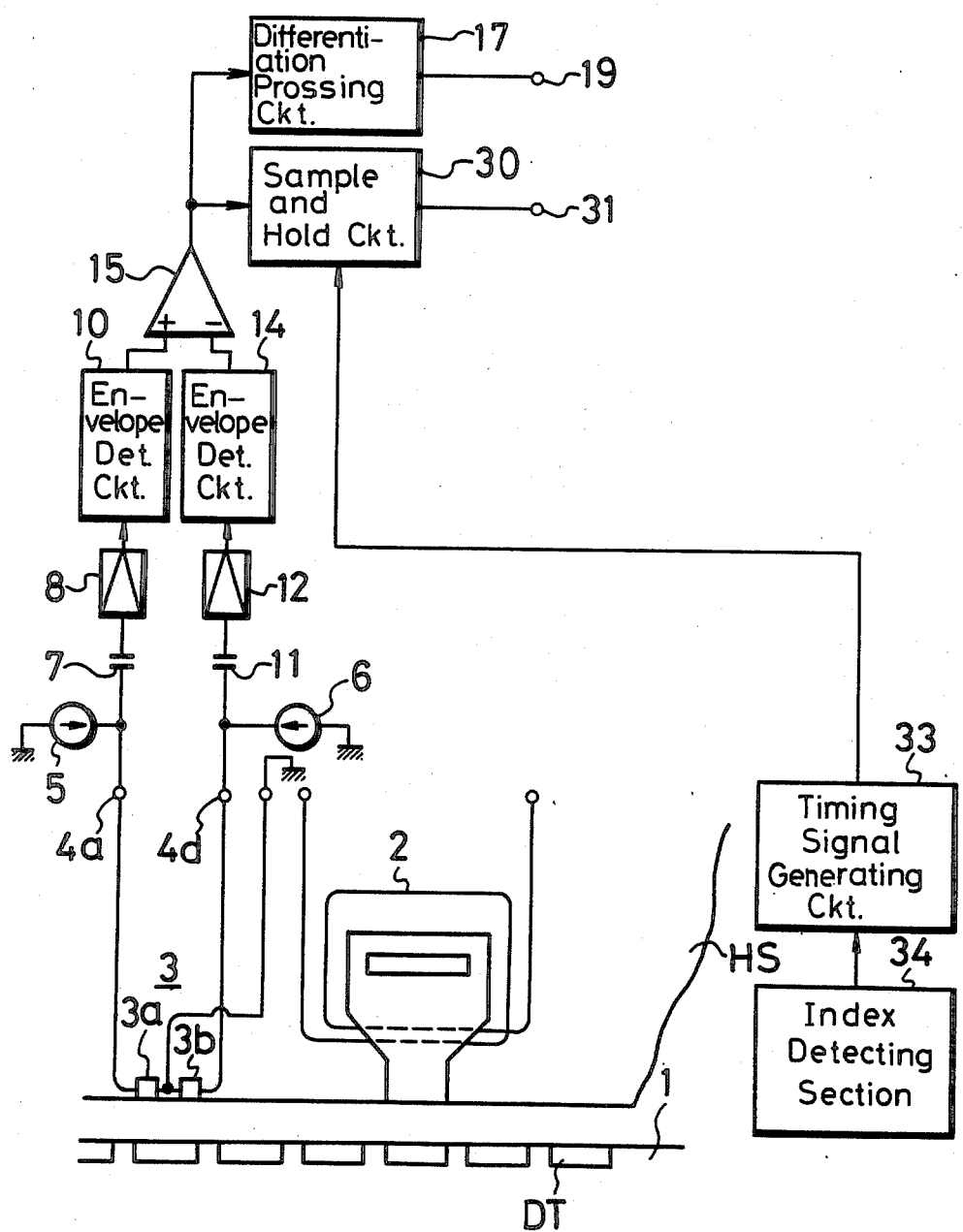
FIG. 13 is a circuit diagram showing a further modified embodiment of the tracking servo system for a disc apparatus according to the present invention.

FIG. 13 is a schematic diagram showing a circuit arrangement of this embodiment. In FIG. 13, the signal processing system from the servo head 3 to the differential amplifier 15 is substantially the same as that in FIG. 1 and so, it will not be described here for simplicity.

Referring to FIG. 13, the head positioning signal developed at the output side of the differential amplifier 15 is directly supplied to the servo control circuit (not shown) in the same way as the speed signal or the like. In the servo control circuit, the head positioning signal is used for the tracking operation to enable the transducer head to correctly trace the track after the head was moved. If the positioning signal is directly supplied to the servo control circuit as described above, this positioning signal is the servo information dependent on the overall sector of the above mentioned data track DT so that it has such a cause that the accuracy in positioning the transducer head will be deteriorated when the track width is changed by the over-writing.

For this reason, according to this embodiment, only a head positioning signal relating only to the gap portion in which a certain fixed pattern is recorded and in which the track width is always constant is extracted, and this head positioning signal is supplied to the servo control circuit as a true servo information (head positioning signal). To this end, the sample and hold circuit 30 is provided at the output side of the differential amplifier 15 and also there are provided a timing pulse generating circuit 33 and an index detecting section 34 to supply the sampling pulse to the sample and hold circuit 30.

Since in the magnetic disc apparatus there is provided an index detecting section which indicates the start point of the data track in a mechanical or magnetic recording fashion so that the start point of one circumference of the data track can be detected, such index detecting section can be utilized as the index detecting section 34 in this embodiment. If an index signal from this index detecting section 34 is used, it is possible to detect the position on the time base or axis where the gap portion or area of each sector exists. The timing pulse generating circuit 33 is adapted to generate a sampling pulse corresponding to the gap area of each sector in synchronism with the index signal derived from the index detecting section 34.

The head positioning signal supplied from the differential amplifier 15 to the sample and hold circuit 30 is sampled and then held by the sampling pulse from the timing pulse generating circuit 33. As a result, the servo information (head positioning signal) corresponding only to the gap portion is developed at the output terminal 31.

Figure 14A:
FIGS. 14A to 14G are timing charts useful for explaining the operation of the embodiment shown in FIG. 13, respectively.
Figure 14B:
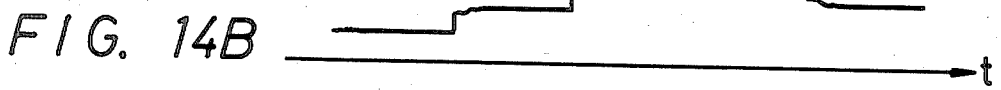
Figure 14C:
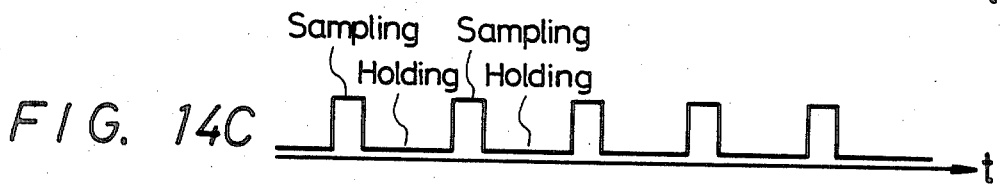
Figure 14D:
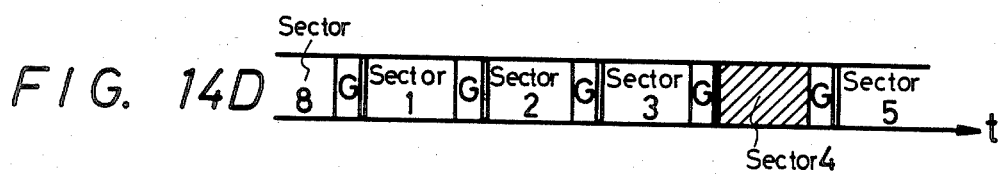
Figure 14E:
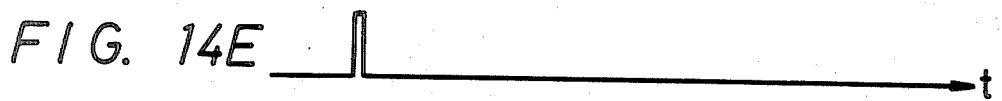
Figure 14F:
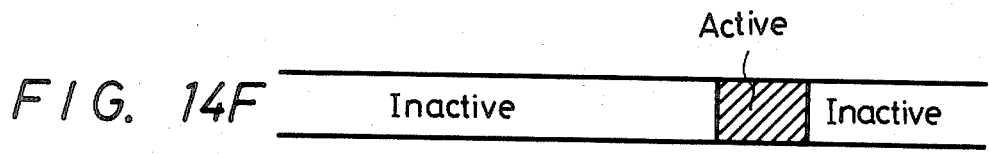
Figure 14G:
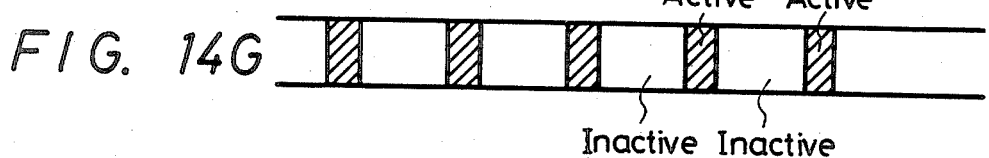

FIGS. 14A to 14G show timing relations with which a certain sector on a data track is rewritten, respectively. Let it be assumed here that the data on the sector 4 be rewritten by the over-writing. FIG. 14A shows the head positioning signal that is developed at the output side of the differential amplifier 15; FIG. 14B shows the head positioning signal that was sampled and then held; FIG. 14C shows the sampling pulse generated from the timing pulse generating circuit 33; FIG. 14D shows the distribution of sectors on a certain data track; FIG. 14E shows the index signal derived from the index detecting section 34; FIG. 14F shows the operation state of the data record/reproduce head 2; and FIG. 14G shows the operation state of the sample and hold circuit 30 (substantially the operation state of the servo head 3).

At the boundary between the sectors 8 and 1, namely, at the start portion of one circumference of the data track shown in FIG. 14D, the index detecting section 34 generates the index signal shown in FIG. 14E. On the basis of this index signal, the timing pulse generating circuit 33 generates the sampling pulse which corresponds to the gap area G of each sector as shown in FIG. 14C. This sampling pulse is supplied to the sample and hold circuit 30. The sample and hold circuit 30 samples and holds the head positioning signal (FIG. 14A) from the differential amplifier 15 by using the sampling pulse supplied thereto from the timing pulse generating circuit 33. In consequence, the sample and hold circuit 30 generates at its output side the head positioning signal that corresponds only to the gap area G of each sector as shown in FIG. 14B.

The hatched area in FIG. 14 G indicates the sampling period of the sample and hold circuit 30, while the non-hatched area indicates the holding period of the sample and hold circuit 30, which coincides with the timing of the sampling pulse shown in FIG. 14C. Ther servo head 3 effects the servo by using the servo information (head positioning signal) corresponding to the gap portion G obtained during the sampling period, while during the holding period, the data is written by the data record/reproduce head 2.

As described above, when the data recorded on the sectors 1, 2, 3, etc., are read out, the servo information obtained from the gap area in which the track width is not changed and sampled and then held is used as the corresponding servo information so that it is possible to avoid the influence exerted when the track width is changed by the over-writing.

At the time corresponding to the sector 4 in FIG. 14D, the data record/reproduce head 2 is placed in the active state as shown in FIG. 14F by the hatched area so that the sector 4 is over-written. In other words, during a time period in which the data is substantially written, the servo head 3 is placed in the inactive state. Conversely, during the time period in which the servo head 3 is placed in the active state, the data is not written. Accordingly, since the servo head 3 and the data record/reproduce head 2 are not placed in the active state simultaneously from a time standpoint, when the data is written, it is possible to prevent the interference, namely, the leakage of the recording signal from the data record/reproduce head 2 to the servo head 3.

In addition, it is needless to say that the servo information is obtained not only from the gap portion but also from the SYNC area and the ID area which are not rewritten, by way of example.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. A servo system for positioning data transducer means relative to a plurality of substantially concentric data tracks on opposed surfaces of a magnetic disc, said system comprising:
   (a) data transducer means including at least first and second data transducer members respectively located relative to opposed surfaces of said magnetic disc;
   (b) servo transducer means, including at least a first and a second pair of servo transducers respectively located relative to opposed surfaces of said magnetic disc and adjacent to one of said first and said second data transducer members, for sensing data tracks and generating output signals representative of a data signal written on the sensed track, a distance between said servo transducers of each of said pairs being related to the dimension of an associated data track and a distance between a pair of said servo transducers and said associated data transducer member being related to a data track pitch;
   (c) signal processing means connecting to said pairs of servo transducers for generating a transducer positioning signal; and
   (d) positioning means for positioning one of said data transducer members in response to said transducer positioning signal derived from another transducer member located relative to the surface of said disc opposite to the surface with which said one of said data transducer members is associated, when said one data transducer member is in a writing mode, and for maintaining a track centerline alignment of said one transducer member.

2. The system as set forth in claim 1 wherein said first data transducer member and said first servo transducer are included with head sliding means movable in radial directions along a surface of said disc, and said second data transducer member and said second servo transducer are included with a second sliding means radially slidable along a second surface of said disc.

3. The servo system as set forth in claim 2 wherein said positioning means includes a servo control circuit responsive to a signal from a selected one of said servo transducers for controlling an actuator to drive said first and said second head sliding means for positioning said data transducers.

4. The servo system as set forth in claim 3 wherein a recording signal generating circuit provides a record signal to a selected one of said second data transducer members.

5. A servo system for positioning data transducer means relative to a plurality of substantially concentric data tracks on a surface of a magnetic disc, said system comprising:
   (a) a pair of servo transducers for sensing said data tracks and generating output signals representative of a data signal written on the sensed track, a distance between said servo transducers being related to the dimension of said data track and a distance between said servo transducers and said data transducer means being related to a data track pitch;
   (b) signal processing means connected to said pair of servo transducers for generating a transducer positioning signal; said signal processing means including sample and hold means for sampling and holding said transducer positioning signal before a writing operation of said data transducer means and for supplying the sampled and held signal to said positioning means during the writing operating of said data transducer means; and
   (c) positioning means for positioning said data transducer means in response to said transducer positioning signal and for maintaining a track centerline alignment of said data transducer means.

6. The servo system as set forth in claim 5 further including magnetic disc control means for sampling the sampled and held signals on said sample and hold circuit.

7. The servo system as set forth in claim 6, wherein said sample and hold means is in circuit with differential amplifier means for sampling and holding a head positioning signal therefrom.

8. The servo system as set forth in claim 5, wherein said sample and hold means produces a head positioning signal which corresponds only to the gap area of the sector before the data is written so that said servo head uses said servo information corresponding to the gap portion obtained in a sampling period, while data is written by the data transducer head during a holding period.

9. The servo system as set forth in claim 5, wherein said signal processing means enables said servo transducer means during a sampling period and disables said servo transducer means during a holding period so that said servo head is inactive while said data transducer means is writing, and said data transducer means is inactive while said servo head is active, thereby preventing leakage of the recording signal from the data transducer means to said servo transducer.

10. The servo system as set forth in claim 5 further including index detecting means for controlling a timing pulse generating means for providing a timing pulse to said sample and hold means.

11. The servo system as set forth in claim 10 wherein said timing pulse generating means generates a sampling of pulses to said sample and hold means corresponding to the gap area of each sector of said magnetic disc in synchronism with an index signal derived from said index detecting means.

12. A servo system for positioning data transducer means relative to a plurality of substantially concentric data tracks divided into a plurality of data sections which provide gap portions therebetween on a surface of a magnetic disc, said system comprising:
   (a) a pair of servo transducers for sensing said data tracks and generating output signals representative of a data signal written on the sensed track, a distance between said servo transducers being related to the dimension of said data track and a distance between said servo transducers and said data transducer means being relating to a data track pitch;
   (b) signal processing means connected to said pair of servo transducers for generating a transducer positioning signal, said signal processing means including sample and hold means for sampling and holding said transducer positioning signal derived from said gap portions and for supplying the sampled and held signal to said positioning means, whereby a track centerline alignment of said data transducer means over said data sectors is maintained with said sampled and held signal; and
   (c) positioning means for positioning said data transducer means in response to said transducer positioning signal and for maintaining a track centerline alignment of said data transducer means.

13. The servo system as set forth in claim 12 further including a timing signal generating means for sampling the sampled and held signals on said sample and hold circuit.

14. The servo system as set forth in claim 13, wherein said sample and hold means is in circuit with differential amplifier means for sampling and holding a head positioning signal therefrom.

15. The servo system as set forth in claim 12, wherein said sample and hold circuit produces a head positioning signal which corresponds only to the gap area of the sector before the data is written so that said servo head uses said servo information corresponding to the gap portion obtained in a sampling period, while data is written by the data transducer head during a holding period.

16. The servo system as set forth in claim 12, wherein said signal processing means enables said servo transducer means during said sampling period and disables said servo transducer means during a holding period so that said servo transducer means is inactive while said data transducer means is writing, and said data transducer means is inactive while said servo head is active, thereby preventing leakage of the recording signal from the data transducer means to said servo transducer means.

17. The servo system as set forth in claim 12 further including index detecting means for controlling said timing pulse generating means for providing a timing pulse to said sample and hold means.

18. The servo system as set forth in claim 17, wherein said timing pulse generating means generates a sampling of pulses to said sample and hold means corresponding to the gap area of each sector of said magnetic disc in synchronism with an index signal derived from said index detecting means.

* * * * *